INVENTOR.
James R. Baxter
BY
William M. Hobby
Attorney

Jan. 5, 1971     J. R. BAXTER     3,552,106

FRUIT PICKING APPARATUS

Filed June 3, 1968     5 Sheets-Sheet 4

INVENTOR.
James R. Baxter
BY
William M. Hobby
Attorney

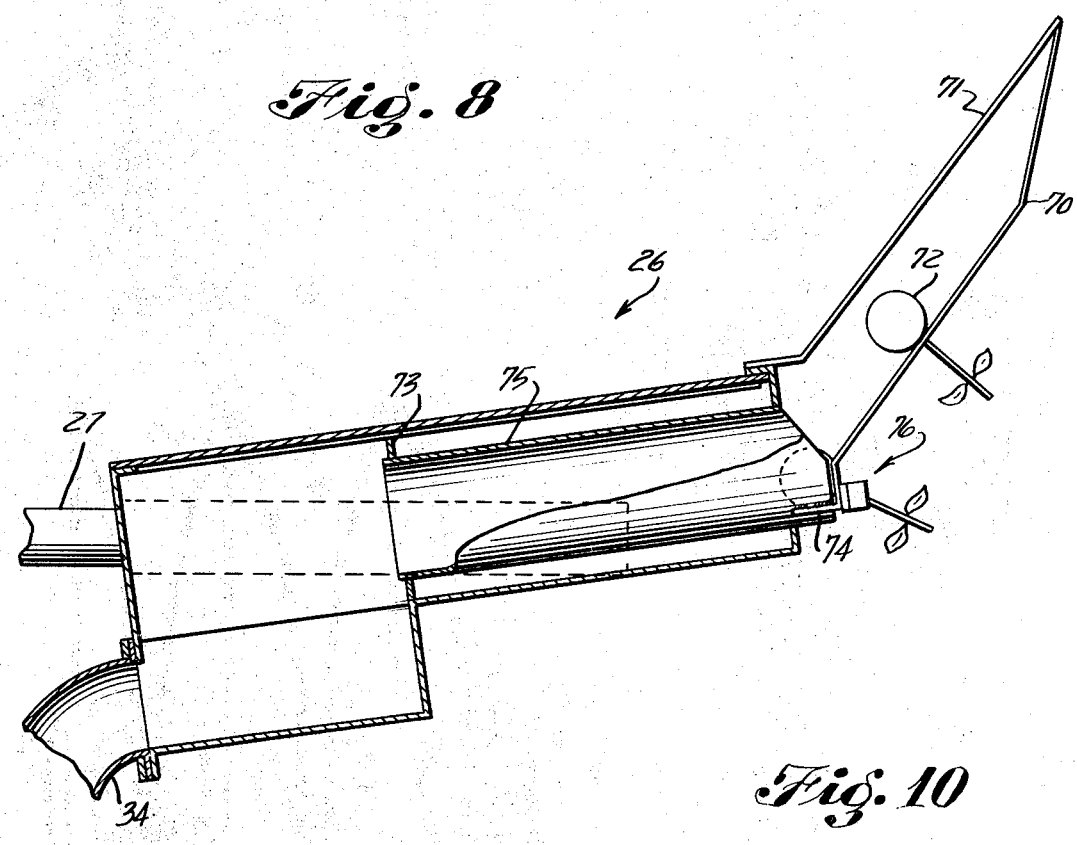
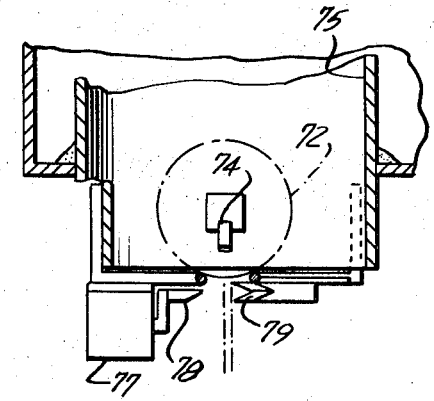
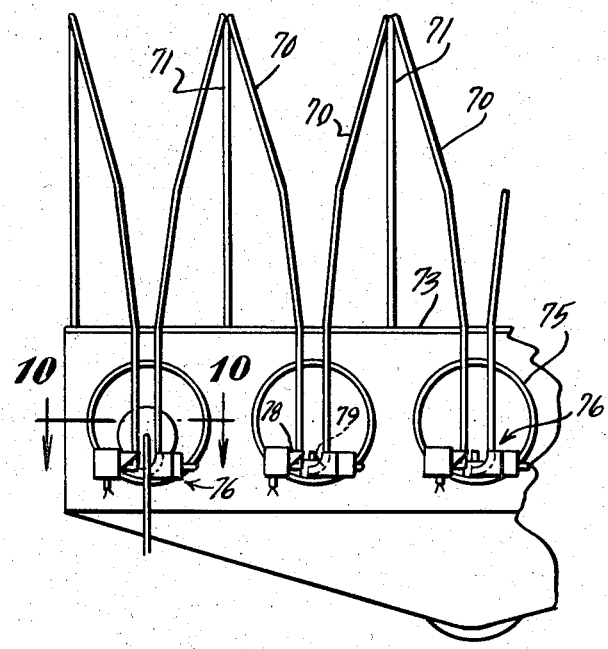

United States Patent Office 3,552,106
Patented Jan. 5, 1971

3,552,106
FRUIT PICKING APPARATUS
James R. Baxter, 3 W. Rose St., Kissimmee, Fla. 32741
Filed June 3, 1968, Ser. No. 734,026
Int. Cl. A01g 19/08
U.S. Cl. 56—328                                              8 Claims

ABSTRACT OF THE DISCLOSURE

A fruit picking apparatus especially adapted to harvest citrus fruit and having a rake or comb with a plurality of teeth for combing through tree foliage to catch the fruit therein. The fruit slides to the end of the comb teeth where a switch actuates a solenoid cutter adapted to cut the stem holding the fruit at a point very close to the fruit. A transporting means is provided to comb the foliage with power means and to move the picking apparatus around a large portion of the tree without shifting the carriage frame and wheels.

BACKGROUND OF THE INVENTION

(1) Field of the invention

This invention relates to fruit picking machines and more particularly to an automatic fruit picking machine for picking citrus fruits, such as oranges, grapefruit, or the like, from trees.

(2) Description of the prior art

In the past the picking of citrus fruits other than by hand and with aids such as cherry pickers has presented many problems because of the fact that the fruit is very strongly held to the trees and thus takes considerable force to remove without damage to the fruit or to the trees.

Many approaches have been devised to remove citrus fruit by machine harvesting but these have frequently been copied from harvesters used for other types of fruit and heretofore have had only limited success. One approach has been to shake the trees with a mechanical shaker which grasps the tree trunk and rapidly shakes the fruit loose while a net of some type is used to catch the fruit that falls from the tree. This type of device has met with only limited success on those types of fruits that are more loosely held and can do considerable damage to the trees. Attempts have been made to find chemicals to apply to the trees for loosening the fruit but such chemicals have to date been expensive or have not proven safe. Another approach has been to blow the fruit off the trees with big wind producing machines and has problems similar to the shaking machine in that the trees are damaged by limbs and the like being blown off the tree, along with the fruit. Other devices have tried raking the fruit off with long armed mechanical rakes moved through the trees in various manners in order to pull the fruit from the trees but this method also results in damage to the trees by pulling limbs therefrom and by bruising and scraping the fruit and limbs. One group of devices has used large groups of spindles or borers that are rotated and moved into the trees to cut or twist the fruit loose, and various devices for cutting the limbs holding the fruit have been suggested, as has the application of a D.C. voltage to the trees to loosen the fruit.

One prior art machine has continuously operated cutter blades located behind a notched guide to direct the tree limbs into the cutter. A groove at the end of the notch has a guard to prevent the premature entry of a limb into the cutting area and a roller is used to help guide the limbs.

Finally, one prior device has a means for sucking the fruit into a tube and cutting it with a photoelectric cell relay activated cutter. The fruit may then be sucked through the tubing and into the storage container.

BRIEF DESCRIPTION OF THE DRAWINGS

Other objects, features, and advantages of this invention will be apparent from a study of the written description and the drawings in which:

FIG. 6 is a sectional view taken along line 6—6 of FIG. 1 on an enlarged scale;

FIG. 8 is an enlarged sectional view taken along section line 8—8 of FIG. 1;

FIG. 9 is a front elevational view of the structure shown in FIG. 8;

FIG. 10 is an enlarged sectional view taken along section line 10—10 of FIG. 9.

DESCRIPTION OF THE PREFERRED EMBODIMENT

Figure 1:
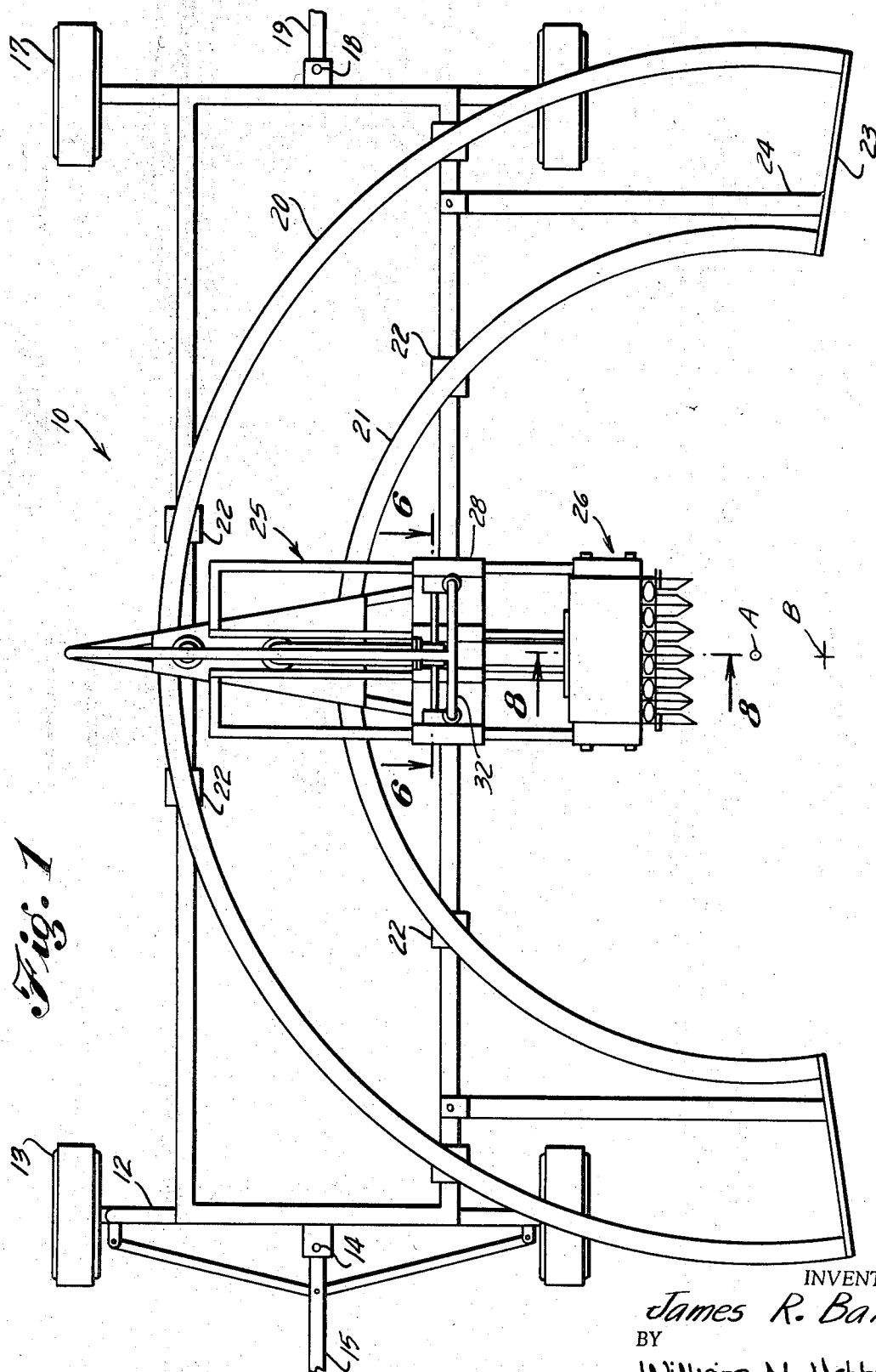
FIG. 1 is a top plan view of one embodiment of the present invention.

Referring to FIGS. 1–6 and particularly to FIG. 1 there is shown an embodiment of my fruit picking apparatus 10 having a frame 11 with a front axle 12 and wheels 13 rotatably attached thereto. The front wheels 13 are steerably mounted to axle 12 by means of a pivot structure 14 attached by conventional means to a wagon tongue 15 which may in turn be attached to a tractor or other vehicle for movement from place to place. The rear of frame 11 has a rigid axle with rear wheels 17 rotatably attached thereto and a pin connection 18 movably attaching a second wagon tongue 19 to the frame 11 which second tongue may be used for attachment to a trailer or the like, for transporting the fruit from a grove. At this point it should be noted that other connection means could be used for the fruit transporting trailer or such carrier may even be incorporated into the frame of the picker, or that a conveyance system may be used for transporting the fruit from the fruit picking apparatus 10 to a trailer for hauling the fruit, without departing from the spirit and scope of the invention.

The frame 11 has curved tracks or rails 20 and 21 attached thereto by means of clamps 22 which are clamped to the frame 11 but welded to the tracks. Tracks 20 and 21 could of course be connected in any desired manner to the frame 11 and would normally be substantially centered on the frame 11. The track 21 may have a center of curvature "A" with respect to the center "B" of the fruit tree and is located such that the picking apparatus, to be discussed later, may ride around the tracks 20 and 21 and thus around a fruit tree in such a manner as to complete the picking of a large portion of a tree without having to move the entire apparatus 10 to another position. Tracks 20 and 21 have bracing members 23 and 24 on each side and the frame 25 is movably connected to the tracks 20 and 21 by a plurality of guide wheels, or the like, as will be described in more detail later. Frame 25 has a cutter head assembly 26 which will be described in connection with FIGS. 7–9. Cutter head assembly 26 is movably mounted to frame 25 for horizontal movement by the sliding of head holding bars 27 sliding in apertures in member 28 and for vertical movement along bars 29 sliding in through apertures in member 28.

Figure 2:
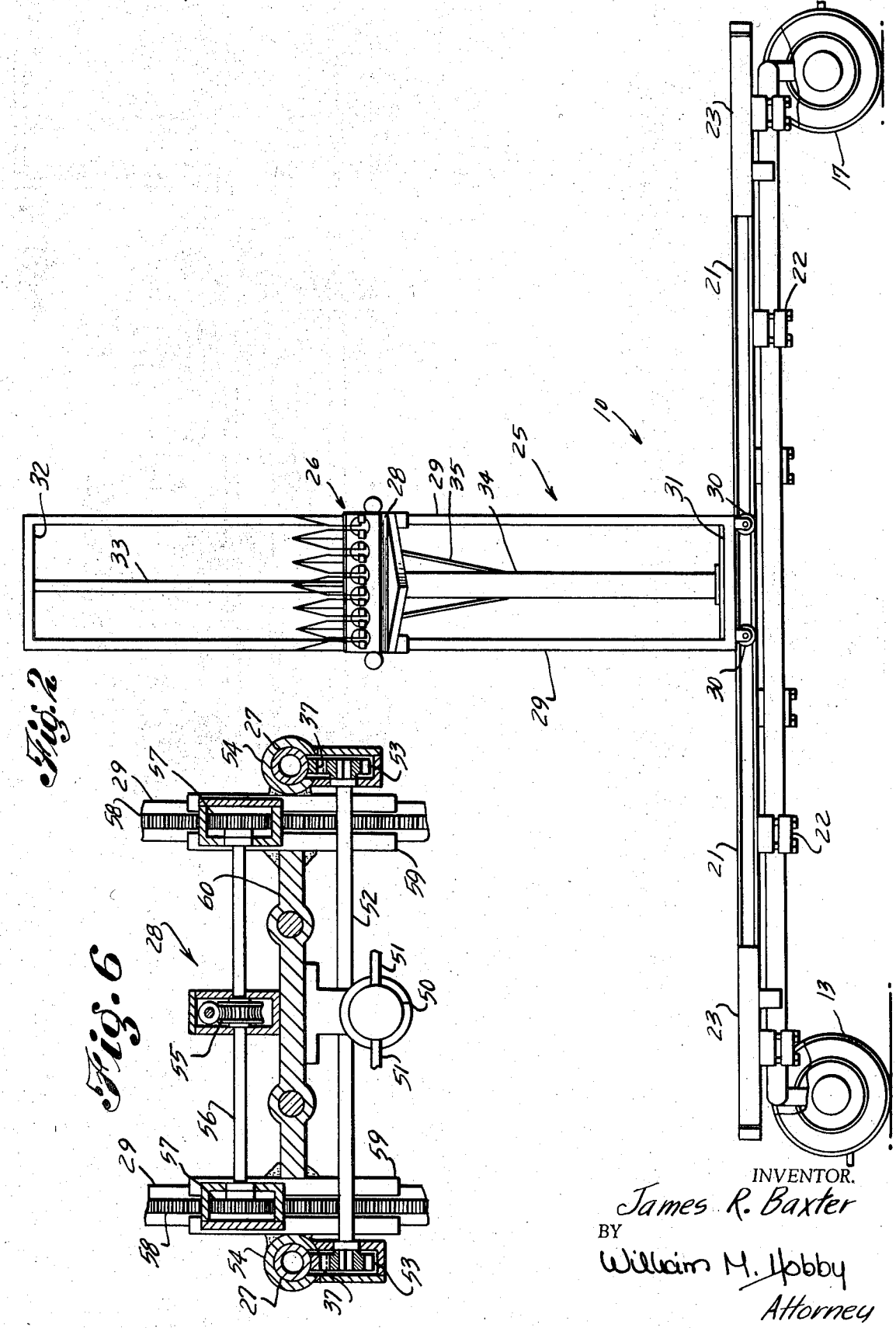
FIG. 2 is a front elevation view of the embodiment of FIG. 1.

FIG. 2 shows wheels 17, rails 21, supports 23 and clamps 22 from a different view. Frame 25 has guide wheels 30 for the frame to move around the tracks 20 and 21 and to hold the frame to the tracks. Vertical bars 29 are connected to a front base bar 31 and top bar 32 and a center bar 33 is connected between the base and the top bar 32. A flexible chute 34 is supported by a support member 35 which may be seen more clearly in FIG. 3.

Figure 3:
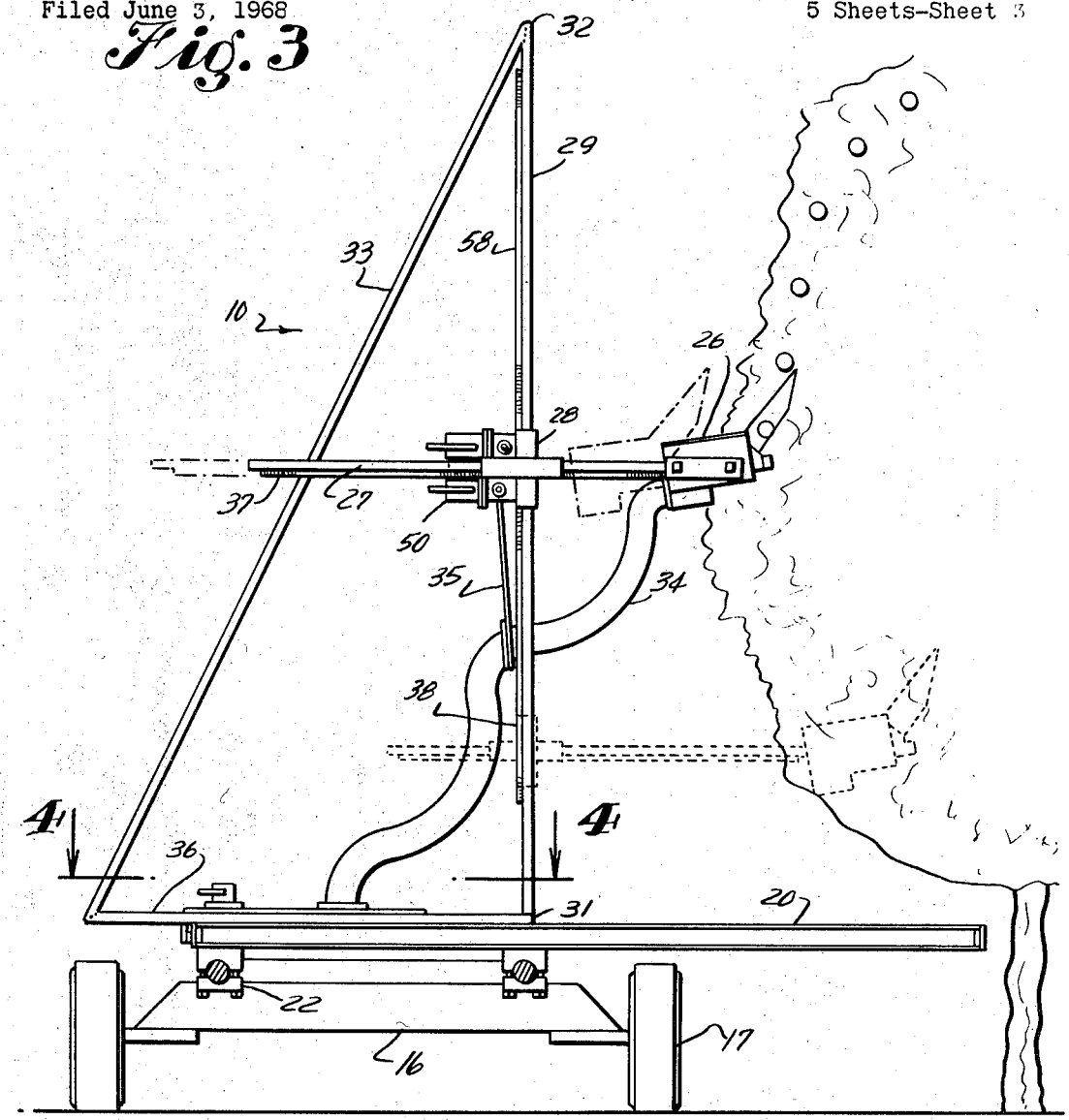
FIG. 3 is an end view of the embodiment of FIGS. 1 and 2.

FIG. 3 shows another view of the apparatus 10 having frame 11, wheels 13, clamps 22 and track 20. Frame 25 has vertical bars 29 and 33, horizontal bars 27, front base bar 31, top base bar 32, two side base bars 36, chute support 25 and chute 34 connected to the cutter head assembly 26 and to the base of the frame 25 with the support 35 held by member 28. This figure also shows phantoms of the cutter head assembly in different positions of the cutter head assembly as it moves through a tree to remove the fruit. Horizontal drive chain 37 and vertical drive chain 38 may also be seen and is used in moving the cutter head vertically and horizontally by power means as described in more detail in connection with FIGS. 6 and 10.

Figure 4:
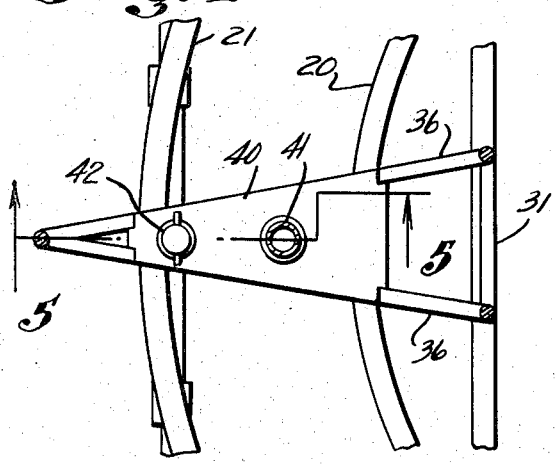
FIG. 4 is a sectional view taken along line 4—4 of FIG 3.

Referring to FIG. 4, a view taken along lines 4—4 of FIG. 3 provides a view of side base members 36, front base member 31 and a reinforcing base plate 40 having an opening 41 for the chute 34. Additional reinforcing bars are connected between side base bars 36 beneath the plate 40 which cannot be seen. As can be seen, the base of frame 25 is riding on top of tracks 20 and 21 and the top of a fluid motor 42 used to drive the frame 25 on tracks 20 and 21.

Figure 5:
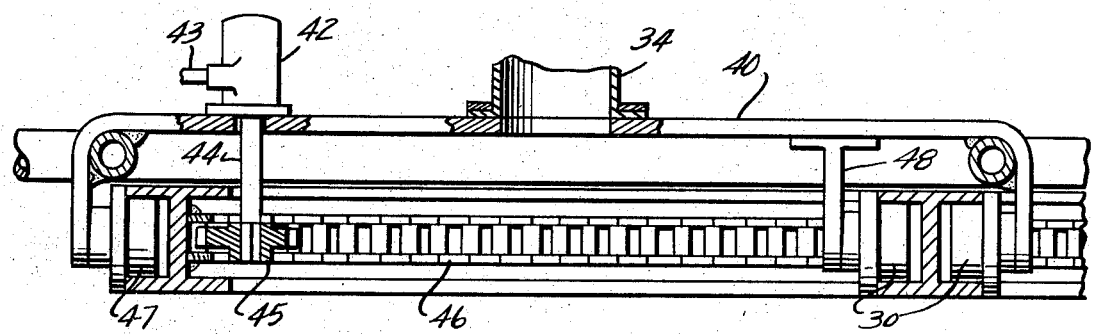
FIG. 5 is a sectional view taken along line 5—5 of FIG. 4 on an enlarged scale.

FIG. 5 is a view taken along lines 5—5 of FIG. 4 and has a fluid motor 42 powered by fluid received through hoses 43 from a central reservoir and drives a shaft 44 and sprocket gear 45 connected to shaft 44. Gear 45 engages chain 46 placed inside a slide groove in track 20 and is used to move the frame 25 around the tracks 20 and 21. The base of frame 25 has wheels 30 on track 21 and wheels 47 on track 20 for the frame to move on. Reinforcing plate 40 has chute 34 connected thereto and also brackets 48 for the connection of inside wheels 30.

FIG. 6 is taken along line 6—6 of FIG. 1 and shows the means of driving the cutter head 26 (FIG. 2) horizontally and vertically. A fluid motor 50 receives fluid through hoses 51 from a central reservoir and drives a shaft 52 which in turn rotates sprocket gears 53 on either end of shaft 52. Gears 53 engage chain 37 (see also FIG. 3) to move sliding member 28 back and forth in a substantially horizontal plane with bars 27 sliding through pipes 54. A second fluid motor (not shown) drives a gear 55 connected to shaft 56 with sprocket gears 57 connected to each end of the shaft 56. Gears 57 engage chains 58 attached to vertical bars 29 and move members 28 up or down in a substantially vertical plane with bars 29 sliding through pipes 59. Pipes 54 and 59 and other parts of member 28 are framed together by a metal plate 60.

Figure 7:
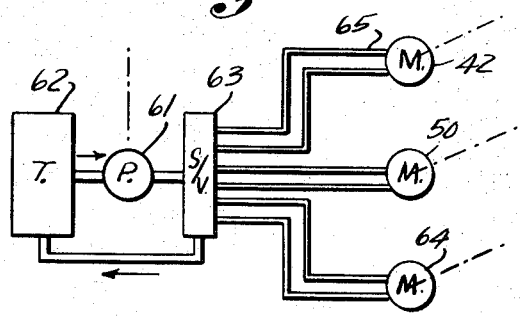
FIG. 7 is a diagram illustrating an hydraulic drive system for use in the device shown in FIGS. 1 to 6.

FIG. 7 illustrates a hydraulic drive system that may be used in connection with the above described fluid motors. A central power source 61 drives a fluid from a reservoir tank 62 through a central control unit 63 utilizing valves to selectively drive motors 42 (FIG. 5), 50 (FIG. 6) and 64. The system requires connecting hoses or pipes 65.

At this point it can be seen that an apparatus has been provided for the power control and movement of a cutting head assembly for use on fruit trees and the like, in which the cutting head may be moved by power in a horizontal and vertical direction as well as around generally circular tracks. Applicants do not however wish to be limited for any particular embodiment and may use many variations and changes without departing from the spirit and scope of the invention. For instance, electric motors driven by truck batteries or by self-contained generators have been successfully used by applicant to power the invention and obviously could be substituted for the hydraulic system disclosed.

Turning now to FIGS. 8–11, the cutting head assembly 26 and its operation is shown in more detail. FIG. 8 is taken along line 8—8 of FIG. 1 and shows cutter head assembly support bars 27 and chute 34 connected to the cutter head 26. Cutter head assembly 26 has raking or combing teeth or tines 70 reinforced by rods 71 so that teeth 70 will catch the fruit 72 as it combs through the foliage of the fruit tree. The teeth 70 are arranged at angles and located next to each other so that the fruit will be pulled toward the frame 73 and toward feeder pipe 75. Fruit 72 upon contact with a contact switch 74 actuates a solenoid 77 (FIG. 10) which in turn drives a cutter 76 to cut the stem holding the fruit at a point very close to the fruit and therefore not damaging the tree by removal of an excess of foliage and limbs. Once the fruit is cut from the stem, it will roll, slide, or fall through the tilted frame 73 feeding pipe 75 and into chute 34 for conveyance to a storage container or the like.

FIG. 9 shows a section of another view of cutter head assembly 26 having teeth 70 and support bars 71 connected to the frame 73. Cutters 76 are at the junction of the teeth 70 and the mouth of the feeder tube 75 and are not activated until the fruit makes contact with a switch 74 which switch is located to assure a minimum amount of stem and other foliage will be cut with the fruit and to avoid cutting foliage having no fruit thereon. FIG. 10 is taken along line 10—10 of FIG. 9 and shows the contact switch 74 in the mouth of the tube 75 and pulling solenoid 77 which drives a cutting blade 78 against a fixed cutting surface 79 for cutting the stem holding the fruit. As can be seen the fruit 72 hits the contact switch 74 activating the solenoid 79 to cut the fruit stem very close to the fruit. The combing operation with the teeth 70 having positioned the fruit in the proper place. The solenoid would typically be a 12-volt D.C. type for operation from vehicle batteries or the like but could have another source of current such as a generator driven by the power source for the other power drives described.

Figure 11:
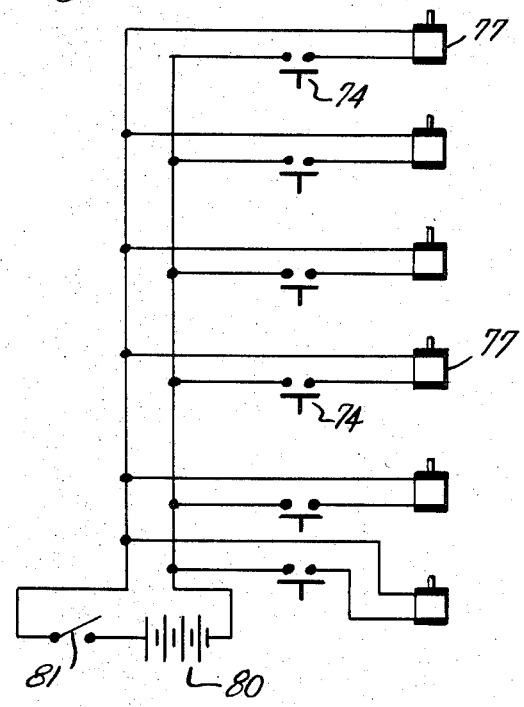
FIG. 11 is a diagram of the electrical circuit for operating the cutter heads.

FIG. 11 shows a typical circuit diagram used to drive the cutters and includes a battery source 80, master disabling switch 81, several solenoids 77 and several contact switches 74, it being clear that a plurality of cutting elements will normally be used in one cutting head assembly.

From the foregoing description it will be clear that a fruit picking machine has been provided for harvesting fruit from trees in a grove and specifically adapted for picking citrus fruits. The apparatus as described has applications for many types of fruit and it is to be understood that variations are contemplated as being within the spirit of the invention. For instance, the solenoid operated cutters could be of a pull rather than a push type, even though I presently prefer cheaply available types such as used on the starter motors of many automobiles. The cutters could be of many variations and I have successfully utilized small hand clippers appropriately connected to the cutting head assembly and to the solenoids. Also, the unit can be mounted directly on a vehicle rather than pulled behind one and it is to be understood that I contemplate using the cutting head arrangement for a portable man carrying picker to allow an individual to pick fruit from a tree without using cherry pickers or ladders or the like.

This invention is not to be construed as limited to the particular forms disclosed herein, since these are to be regarded as illustrative rather than restrictive.

I claim:
1. A fruit picking apparatus comprising in combination:
   (a) A frame,
   (b) A plurality of combing teeth attached to said frame and adapted to pass through tree foliage and to catch fruit,
   (c) At least one contact switch means, each said switch means located in juxtaposition to the junction of said combing teeth with said frame and adapted to be activated by contact with fruit caught in said combing teeth; and
   (d) At least one cutting means adapted to cut the stems of fruit caught in said comb when activated by said switch means.

2. The apparatus according to claim 1 in which each said cutting means includes an electric solenoid for activating the cutting blades on said cutting means.

3. The apparatus according to claim 2 in which said solenoid is a push type solenoid.

4. The apparatus according to claim 2 in which said combing teeth includes pairs of bars each bar fixedly attached to said frame at separated point one end thereof, and joined at said other end.

5. The apparatus according to claim 4 in which each said contact switch means is connected to said frame.

6. The apparatus according to claim 5 in which said combing teeth are slanted in a manner adapted to guide fruit toward said frame.

7. The apparatus according to claim 6 in which said frame is slanted so that cut fruit will fall towards the rear of said frame.

8. The apparatus according to claim 7 but including a chute connected to said frame adapted to guide said fruit to storage means.

References Cited
UNITED STATES PATENTS

| | | | |
|---|---|---|---|
| 3,127,725 | 4/1964 | Richardson | 56—328 |
| 3,165,880 | 1/1965 | Buie, Jr. | 56—336 |
| 3,200,575 | 8/1965 | Hurst | 56—328 |
| 3,374,613 | 3/1968 | McDonald | 56—334 |
| 3,377,787 | 4/1968 | McCann | 56—328 |
| 3,404,521 | 10/1968 | Thorn et al. | 56—328 |
| 3,413,786 | 12/1968 | Wehr | 56—328 |
| 3,451,202 | 6/1969 | Murray | 56—328 |
| 3,460,330 | 8/1969 | Black, Jr. | 56—328 |

RUSSELL R. KINSEY, Primary Examiner